3,682,886
ANTIBIOTIC 18.631 R.P.
Denise Mancy, Charenton, and Leon Ninet and Jean
 Preud'Homme, Paris, France, assignors to Rhone-
 Poulenc S.A., Paris, France
Filed Feb. 13, 1969, Ser. No. 798,980
Claims priority, application France, Feb. 14, 1968,
139,878; July 24, 1968, 160,462
Int. Cl. C07c 129/18
U.S. Cl. 260—210 AB    3 Claims

ABSTRACT OF THE DISCLOSURE

The new acidic antibiotic 18,631 R.P. is prepared by aerobically cultivating Streptomyces hygroscopicus DS 9,751 (NRRL 3418), Streptomyces albocinerescens DS 21,647 (NRRL 3419) or Streptomyces roseochromogenes, var. oscitans DS 12,976 (NRRL 3504) on an aqueous nutrient medium containing assimilable sources of carbon, nitrogen and inorganic substances. The antibiotic is particularly effective against gram-positive microorganisms.

---

This invention relates to a new antibiotic, hereinafter designated by the number 18,631 R.P., to a process for its preparation and pharmaceutical compositions containing it.

The new antibiotic is of very particular interest because of its high antibacterial activity against gram-positive microorganisms and significant activity against certain gram-negative microorganisms. It can be obtained from artificial culture media containing microorganisms identified more completely hereinafter, belonging to the genus Streptomyces and hereinafter designated respectively by the names Streptomyces hygroscopicus DS 9,751 (NRRL 3418), Streptomyces albocinerescens DS 21,647 (NRRL 3419) and Streptomyces roseochromogenes DS 12,976, var. oscitans (NRRL 3504). Specimens of these three microorganisms have been deposited with the United States Department of Agriculture, Northern Regional Research Laboratory, at Peoria, Illinois, United States of America, where they have been given the numbers NRRL 3418, NRRL 3419 and NRRL 3504 as indicated above; samples of the microorganisms may be obtained from the U.S. Department of Argiculture, Agricultural Research Service, Fermentation Laboratory, Peoria, Ill., U.S.A.

Antibiotic 18,631 R.P. is in the form of a white microcrystalline powder and has the following physico-chemical properties:

Melting point: 206° C.

Solubility.—It is easily soluble in dimethylsulphoxide, soluble in dilute strong bases, methanol, ethanol, acetone, dioxan, chloroform, dimethylformamide and ethyl acetate, sparingly soluble or insoluble in water, aqueous solutions of sodium bicarbonate, dilute strong acids, carbon tetrachloride, acetonitrile and hexane.

Structural formula:

Elementary composition (calculated for
$C_{35}H_{37}O_{11}N_2Cl$)

(percent): C=60.29, H=5.35, O=25.24, N=4.02, Cl=5.09

Optical Rotation:

$[\alpha]_D^{20} = -68° \pm 1.5°$ (c.=1, ethanol)
$[\alpha]_{436}^{20} = -199° \pm 2.5°$ (c.=1, ethanol)
$[\alpha]_D^{21} = -80° \pm 2°$ (c.=0.6, acetone)
$[\alpha]_{436}^{21} = -224° \pm 2.5°$ (c.=0.6, acetone)

Figure 1:
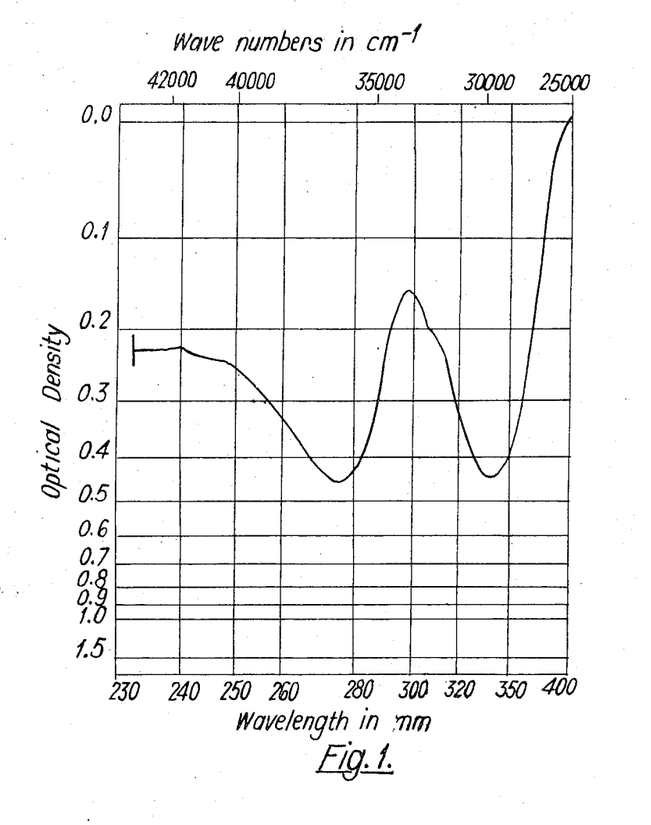

Ultra-violet spectrum (determined on a chloroform solution containing 10 mg./l.):

absorption maximum at 275 nm. ($E_{1cm.}^{1\%}=444$)
shoulder at 307 nm. ($E_{1cm.}^{1\%}=201$)
absorption maximum at 337 nm. ($E_{1cm.}^{1\%}=434$)
(nm.=nanometre)

This spectrum is shown in FIG. 1 of the accompanying drawings in which the abscissae give the wave lengths expressed in nanometres (lower scale) and the wave numbers in cm.⁻¹ (upper scale), and the ordinates give the optical densities.

Figure 2:
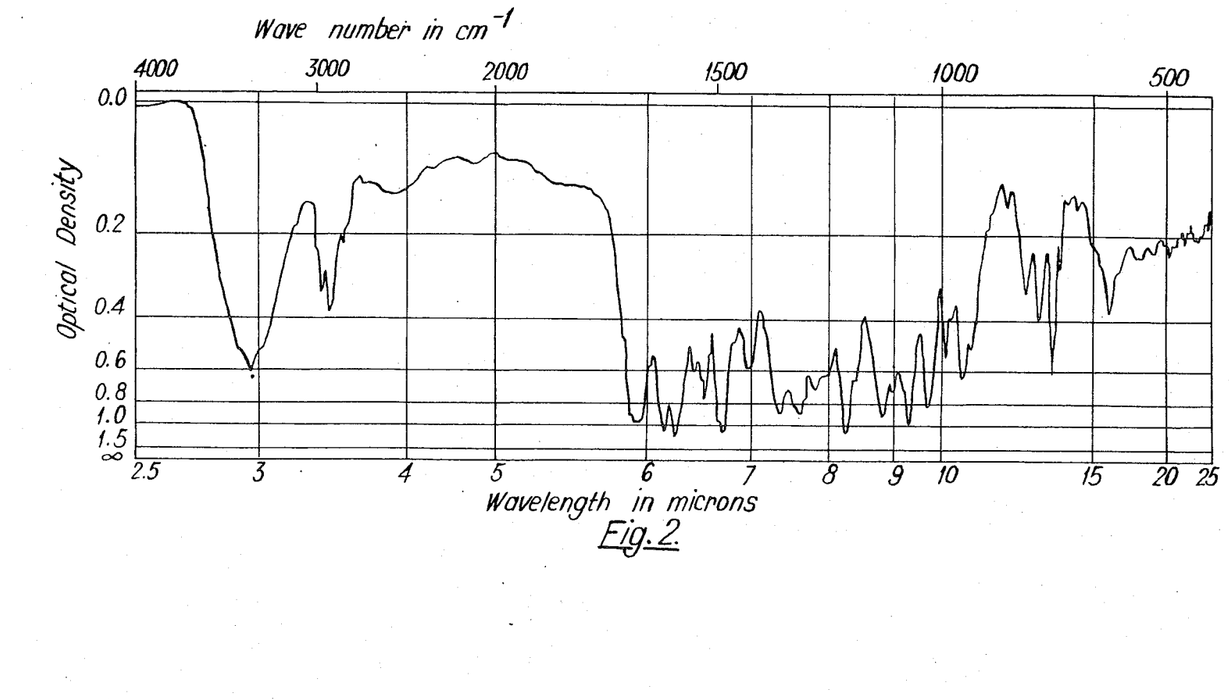

Infra-red spectrum (determined on tablets of a mixture with K Br).

This spectrum is shown in FIG. 2 in which the abscissae give the wave lengths expressed in microns (lower scale) and the wave numbers in cm.⁻¹ (upper scale), and the ordinates give the absorptions as optical densities.

The principal infra-red absorption bands (in cm.$^{-1}$) of 18,361 R.P. are given in Table I which follows:

TABLE I

| | | |
|---|---|---|
| 3,440 sh | 1,530 s | 980 w |
| 3,360 s | 1,500 sh | 950 s |
| 3,300 sh | 1,495 sh | 935 m |
| 3,100 sh | 1,485 vs | 855 m |
| 2,970 m | 1,460 m | 810 s |
| 2,920 s | 1,430 s | 780 s |
| 2,840 m | 1,360 s | 750 s |
| 2,820 sh | 1,315 s | 735 m |
| 2,720 w | 1,280 m | 720 w |
| 2,560 m | 1,255 w | 695 w |
| 2,100 m | 1,215 vs | 660 sh |
| 1,850 w | 1,190 m | 645 sh |
| 1,685 vs | 1,130 s | 625 s |
| 1,625 s | 1,110 m | 605 sh |
| 1,595 vs | 1,070 s | 565 w |
| 1,555 m | 1,030 s | 555 m |
| 1,540 sh | 990 s | 530 m |
| | | 500 m |

Where—vs=very strong; s=strong; m=medium; w=weak; sh=shoulder.

Acid-base reaction.—18,631 R.P. is a weak acid having a neutralisation equivalent, measured by potentiometric titration of a solution in a mixture of methanol and water (25-10 by volume) with decinormal sodium hydroxide solution, of 695. It forms salts, e.g. alkali metal salts.

Colour reactions.—18,631 R.P. gives the following reactions: strongly positive in the Molisch, Folin-Denis, permanganate-sulphuric acid (in the cold), Fehling, indole-sulphuric acid, cysteine, carbazole, Dische (with phloroglucinol), Elson-Morgan and Dische-Borenfreund (after deamination) reactions, weakly positive in the Pauly, Adamkiewicz, Tollens and Seliwanoff-Roe reactions, and negative in the Millon, ninhydrin, biuret, xanthoproteic, diazotisation, Ehrlich-Salkowsky, ferric chloride, Morner, Zimmermann-Bitto, Pechmann, Tauber, Bial, Wheeler-Tollens, ferric maltol, Sakaguchi and Nessler reactions.

Dialysis.—18,631 R.P. dialyses through a regenerated cellulose membrane (Cellophane type).

Chromatographic migrations.—(Developed by bioautography on plates of nutrient agar inoculated with *Staphylococcus albus*); The migrations observed on various supports and under the influence of different solvents are indicated in Table II.

TABLE II

| Support | System (composition by volume) | Rf |
|---|---|---|
| Arches 302 nonbuffered paper | Butanol saturated with water | 0.95 |
| Do | Benzene-methanol (4-1) | 0.95 |
| Do | NH₄Cl, 30 g./l. in water | 0.05 |
| Do | Butanol-acetic acid-water (4-1-5—upper phase) | 1.00 |
| Do | Ethyl acetate-cyclohexane (1-1) saturated with water. | 0.50 |
| Arches 302 paper impregnated with a phosphate buffer solution, pH 7, M/3. | Chloroform | 0.50 |
| Alumina (thin layer) | Methanol-water (95-5) | 0.27 |
| Kieselgel G (silica gel), thin layer | Butanol-acetic acid-water (4-1-5—upper phase) | 1.00 |
| Do | Carbon tetrachloride-ethanol-acetic acid (90-6-6). | 0.50 |

Bacteriostatic activity of 18,631 R.P. in vitro.—18,631 R.P. has a high antibiotic activity towards a certain number of bacteria of which the most sensitive are to be found amongst those accepting the Gram stain; its activity is particularly high against staphylococci. It shows a more restricted activity against Gram-negative bacteria, although it still exerts a considerable activity, in particular, towards certain Neisseria.

It does not shown cross resistance with aureomycin, streptomycin, chloramphenicol, erythromycin, carbomycin, spiramycin, or pristinamycin, but on the other hand shows considerable cross resistance with novobiocin.

Table III below gives the concentrations of 18,631 R.P. which are required to ensure bacteriostasis of certain microorganisms. They were determined by one of the dilution methods usually employed for this purpose: for each microorganism the minimum concentration of antibiotic, which under specified conditions inhibits all visible development of the microorganism in an appropriate nutrient broth, was determined. These minimum bacteriostatic concentrations of the antibiotic are expressed in micrograms of substance per cc. of test medium in the following table.

TABLE III

| Bacterial Organisms Tested: | Minimum bacherostatic concentrations in μg/cc. |
|---|---|
| *Staphylococcus aureus*, 200 P strain—ATCC 6538 P | 0.005 |
| *Staphylococcus aureus*, Smith strain | 0.003 |
| *Sarcina lutea*—ATCC 9341 | 0.02 |
| *Streptococcus faecalis*—ATCC 9790 | 0.04 |
| *Streptococcus viridans* (Institut Pasteur) | 3 |
| *Streptococcus pyogenes hemolyticus* (Dig 7 strain, Institut Pasteur) | 0.05 |
| *Diplococcus pneumoniae* (Til strain, Institut Pasteur) | 0.03 |
| *Neisseria catarrhalis* (A 152—Institut Pasteur) | 0.005 |
| *Neisseria meningitidis* (5813—Institut Pasteur) | 0.05 |
| *Neisseria gonorrhaeae* (A 50—Institut Pasteur) | 0.4 |
| *Lactobacillus casei*—ATCC 7469 | 1 |
| *Bacillus subtilis*—ATCC 6633 | 0.6 |
| *Bacillus cereus*—ATCC 6630 | 0.5 |
| *Mycobacterium species*—ATCC 607 | 10 |
| *Escherichia coli*—ATCC 9637 | 10 |
| *Proteus vulgaris* | 13 |
| *Klebsiella pneumoniae*—ATCC 10,031 | 1 |
| *Pseudomonas aeruginosa* (Bass strain—Institut Pasteur) | 4 |
| *Brucella bronchiseptica* (CN 387—Wellcome Institute) | 0.3 |
| *Brucella abortus bovis* B 19 (52,135—Institut Pasteur) | 0.1 |
| *Pasteurella multocida* (A 125—Institut Pasteur) | 7 |
| Reiter's treponaema | 12 |

The antibacterial activity of 18,631 RP has been confirmed in vivo with laboratory animals experimentally infected with microorganisms such as streptococci, pneumococci and staphylococci. It proved particularly effective when administered orally and subcutaneously to mice. It also possesses a very good preventive activity towards staphylococcal infections of mice when administered orally and subcutaneously.

Toxicity.—The toxicity of 18,631 RP has been studied principally in mice and determined orally and subcutaneously. In both methods of administration 18,631 RP has proved non-toxic at a dose of 1 g./kg. The 50% lethal dose, or $LD_{50}$, also determined orally and subcutaneously was:

$$LD_{50}=2.2 \text{ g./kg. p.o.}$$
$$1.7 \text{ g./kg. s.c.}$$

These results show that the product is of low toxicity.

The organisms which produce antibiotic 18,631 RP belong to the genus Streptomyces and are designated by the names *Streptomyces hygroscopicus* DS 9,751 (NRRL 3418), *Streptomyces albocinerescens* DS 21,647 (NRRL 3419) and *Streptomyces roseochromogenes* DS 12,976, var. *oscitans* (NRRL 3504). These organisms were isolated from samples of soil coming respectively from:

South Africa in the case of *Streptomyces hygroscopicus* DS 9,751,

France in the case of *Streptomyces albocinerescens* DS 21,647 and India in the case of *Streptomyces roseochromogenes*, var. *oscitans*.

These organisms were isolated by the following method: A small quantity of soil was suspended in sterile distilled water and the suspension diluted to different concentrations; a small volume of each dilution was spread over the surface of Petri dishes containing a nutrient agar medium. After incubation for several days at 26° C. the colonies of microorganisms to be isolated for study were pricked out and transplanted onto nutrient agar slopes so as to obtain more abundant cultures.

The strain DS 9751 belongs to the species *Streptomyces hygroscopicus* of which the essential characteristics have been defined by H. D. Tresner and E. J. Backus (Applied Microbiology, 4, 243–250, 1956) and by S. A. Waksman (The Actinomycetes, II, The Williams and Wilkins Company, Baltimore, 1961, pp. 230–231). For this reason it has been named *Streptomyces hygroscopicus*, strain DS 9751.

In fact, *S. hygroscopicus* DS 9751 shows the following three characteristics which correspond to the three characteristics by which H. D. Tresner and E. J. Backus as well as S. A. Waksman define the species *S. hygroscopicus*: (a) its sporiferous filaments generally terminate in tight spirals having a coil of several turns; these spiral sporiferous filaments are most frequently inserted along a central filament, forming more or less elongated clusters; (b) its aerial sporulated mycelium, when it has reached a good stage of development, shows a deep grey colour corresponding to that shown by the species *S. hygroscopicus*, and (c) on certain culture media which permit good sporulation the appearance on aging of black glossy zones of a moist appearance in the sporulated surfaces, these zones being characteristic of the species *S. hygroscopicus*. In the case of *S. hygroscopicus* DS 9,751 the transformation of the deep grey sporiferous mat into a black coating only takes place rather slowly and discreetly, being generally restricted to small points distributed over the sporulated surface rather than spreading over the entire sporiferous mat. It is nevertheless obvious and can be observed in particular on Pridham yeast extract agar, Carvajal oat agar, ovalbumin agar and glucose-asparagine agar.

The morphological characteristics shown by cultures of *S. hygroscopicus* DS 9,751 are on the whole very similar to those of the strain *S. hygroscopicus* described in "The Actinomycetes" (S. A. Waksman, The Williams and Wilkins Company, Baltimore, 1961, pp. 230–231), the most appreciable differences compared with the characteristics described consisting in that *S. hygroscopicus* DS 9,751 does not cause milk to turn acid but on the contrary causes a very slight change towards alkalinity (the initial pH of 6.3 changing to 7.0 within a month), and secondly that it only produces a very weak brownish soluble pigment on Czapek Sucrose agar. The strain *S. hygroscopicus* described in "The Actinomycetes" on the other hand causes very slight acidification of milk (the pH reaching 6.0) and produces a golden-yellow to light orange soluble pigment on "sucrose-nitrate-agar." These very slight differences obviously do not allow the strain DS 9,751 to be regarded as a different species from the species *S. hygroscopicus*, of which in other respects it shows the principal characteristics used to define it. It should also be noted that the spores of *S. hygroscopicus* DS 9,751 are cylindrical to isodiametric cells with truncated ends, whilst those of the strain *S. hygroscopicus* described in "The Actinomycetes" are oval, but H. D. Tresner and E. J. Backus consider that the shape of the spores is variable in the species *S. hygroscopicus* where these various shapes are encountered.

*S. hygroscopicus* DS 9,751 does not produce a melamine pigment on organic media. On all its culture media it forms a vegetative mycelium ranging from pale yellowish to yellow or yellowish-brown, and the soluble pigments which it elaborates are in yellow to yellowish-brown shades.

*S. hygroscopicus* DS 9,751 forms sporiferous filaments which generally end in tight spirals containing one to 5 turns in most cases, though very occasionally there are observed spirals forming a larger number of turns or also some sporiferous filaments which are simply curved at their end section without forming a complete turn, or also sometimes spirals which are more or less loose and unrolled. The sporiferous structure most frequently has a cluster structure, with the spiral sporiferous filaments being inserted along a principal filament which in some cases can be rather long. The spores have a short cylindrical shape which is more or less regular and measure 0.6 to $0.9\mu$/0.9 to $1.2\mu$. The spiral sporiferous filaments are very slow to fragment so as to liberate the spores and furthermore frequently only fragment partially, thus liberating chains of several spores which retain the shape of a more or less complete ring. Microscopic examinations have shown an identical organisation of the sporiferous structure on Bennett agar, Pridham oat and tomato agar and glucose-asparagine agar.

The culture characteristics and biochemical properties of *S. hygroscopicus* DS 9,751 are recorded in Table IV which follows. They are those of cultures which have reached a good stage of development, and have been aged for about 3 to 4 weeks at 26° C. These characteristics were observed on nutrient agars and broths usually employed to determine the morphological characteristics of strains of streptomyces, the cultures on agar media being carried out on agar slopes. A certain number of the culture media employed were prepared in accordance with the formulae indicated in "The Actinomycetes" (S. A. Waksman, pp. 193–197, Chronica Botanica Company, Waltham, Mass., U.S.A., 1950); in this case they are indicated by the letter W followed by the number which they are given in "The Actinomycetes." The references or compositions of the other culture media are as follows:

Ref. A—K. L. Jones—Journal of Bacteriology, 57, 142 (1949)

Ref. B—Formula W–23 with the addition of 2% of agar

Ref. C—"Hickey and Tresner's Agar"—T. G. Pridham et al.—Antibiotics Annual, 1956–1957, p. 950

Ref. D—"Yeast Extract Agar"—T. G. Pridham et al.—Antibiotics Annual, 1956–1957, p. 950

Ref. E—"Tomato Paste Oatmeal Agar"—T. G. Pridham et al.—Antibiotics Annual, 1956–1957, p. 950

Ref. F—W. E. Grundy et al.—Antibiotics and Chem., 2, 401 (1952)

Ref. G—Peptone 0.5%, meat extract 0.3%, tyrosine 0.5%, agar 2%

Ref. H—"Melanine formation medium"—The Actinomycetes, vol. 2, p. 333—No. 42—S. A. Waksman—The Williams and Wilkins Company, Baltimore, (1961)

Ref. I—W. E. Grundy et al.—Antibiotics and Chem., 1, 310 (1951)

Ref. J—"Inorganic Salts—Starch Agar"—T. G. Pridham et al.—Antibiotics Annual, 1956–1957, p. 951

Ref. K—corresponds to Formula W–1 with 30 g. of sucrose replaced by 15 g. of glucose Ref. L—corresponds to Formula W–1 with 30 g. of sucrose replaced by 15 g. of glycerine Ref. M—"Plain Gelatin"— prepared in accordance with the instructions of "Manual of Methods for Pure Culture Study of Bacteria" of the Society of American Bacteriologists, Geneva, N.Y., $II_{50}$–18

Ref. N—"Synthetic Dimmick medium"—(non-agar)— "Manual of Methods for Pure Culture Study of Bacteria" of the Society of American Bacteriologists, Geneva, N.Y., $II_{50}$–19

Ref. O—corresponds to the Formula W-18 with the sucrose omitted and replaced by small strips of filter paper partially immersed in the liquid Ref. P—Skimmed milk as a commercially available powder, reconstituted in accordance with the manufacturer's instructions Ref. Q—Medium indicated for investigation of the production of $H_2S$ by: H. D. Tresner and F. Danga—Journal of Bacteriology, 76, 239–244 (1958).

TABLE IV

| Culture medium | Degree of development | Vegetative mycelium or underside of the culture | Aerial structure (comprising the combination of the aerial mycelium and the sporulation) | Soluble pigment | Observations, and biochemical properties |
|---|---|---|---|---|---|
| Bennett agar (Ref. A) | Good | Thick and wrinkled, greyish yellow. Underside yellow-brown. | Whitish to light grey and deep grey. Very moderately developed. | Light yellow-brown | Sporiferous structure in clusters. Sporiferous filaments ending in tight spirals of 1 to 5 turns. |
| Emerson agar (Ref. B) | do | do | Greyish-white. Poorly developed | Orange-brown | |
| Hickey and Tresner agar (Ref. C) | do | Thick and wrinkled, light yellow-brown. Underside light yellow-brown. | Whitish to greyish-white. Very poorly developed | Extremely weak brownish | |
| Pridham yeast extract agar (Ref. D) | Very good | Underside yellow-brown | Very light greyish to medium grey and deep grey with some very small black spots characteristic of the species "Hygroscopicus". Rather well developed. | Yellow-brown | |
| Pridham oat and tomato agar (Ref. E) | do | Underside deep yellow-brown | Whitish to light grey and deep grey. Well developed | Rather deep yellow-brown | Sporiferous structure in clusters. Sporiferous filaments ending in tight spirals of 1 to 5 turns. |
| Carvajal oat agar (Ref. F) | do | Underside deep chestnut | Greyish-white to light grey and very deep grey with some small black spots characteristic of the species "Hygroscopicus". Very well developed. | Brown | |
| Glucose-peptone agar (Ref. G) | Good | Underside light yellow-brown. Moderately developed, light yellowish. Underside yellow. | Whitish; traces | Light greyish yellow-brown | |
| Nutrient agar (W-5) | Very moderate | | do | Nil | |
| Tyrosine agar (Ref. G) | Moderate | Light yellowish. Underside yellowish. | Whitish. Moderately developed | Very weak yellowish | No solubilisation of the tyrosine. |
| Tyrosine yeast extract agar "(Melanine formation medium)" of Waksman (Ref. H). | do | Underside orange-brown | Greyish-white; traces | Violet-brown. No blackening of the medium. | Formation of Melanine: negative (readings taken according to the recommendations of the author). |
| Krainsky calcium malate agar (Ref. I). | Medium | Underside light brownish yellow. | Whitish to light greyish. Moderately developed | Nil | Solubilisation of the malate: positive. |
| Ovalbumin agar (W-12) | Moderate | Underside yellow | Whitish to light grey and deep grey with some very small black zones characteristic of the species "Hygroscopicus". Moderately developed. | Light yellow | |
| Glucose-asparagine agar (W-2) | Good | do | Very light greyish to medium grey and black-grey, with some black spots characteristic of the species "Hygroscopicus". Rather well developed. | Light yellow-brown | Sporiferous structure in clusters. Sporiferous filaments ending in tight spirals of 1 to 5 turns. |
| Glycerine-asparagine agar (W-3) | do | Underside light yellow-brown | Whitish to grey. Moderately developed | Very light yellow-brown | |
| Starch-nitrate agar (W-10) | Moderate | Underside light yellow | Whitish with some light grey spots. Moderately developed. | Weak brownish yellow | Hydrolysis of the starch: positive. |
| Pridham starch agar (Ref. J) | Fairly good | Underside yellow-brown | Greyish-white to light grey and deep grey. Mlderately developed. | Weak yellow-brown | Do. |
| Czapek synthetic agar with sucrose (W-1). | do | Underside light brownish yellow. | Whitish to light grey. Moderately developed | Very weak brownish | |
| Czapek synthetic agar with glucose (Ref. K). | Good | Underside light yellow-brown | Whitish. Moderately developed | Weak yellow-brown | |
| Czapek synthetic agar with glycerine (Ref. L). | Moderate | Underside yellow-brown | do | Nil | |
| Culture on potato (W-27) | Fairly good | Fairly well developed. Weak greyish beige to very light brownish. | Whitish. Poorly developed | Nil | |
| 12% pure gelatine (Ref. M) | Medium | Whitish culture with a tendency to sediment in the liquified gelatine. | Nil | Nil | Liquefaction of the gelatine: fairly good. |
| Dimmick glucose-nitrate broth (Ref. N). | do | Whitish colonies on the surface | Greyish-white. Very poorly developed | Nil | Nitrite reaction: positive. |
| Czapek broth with sucrose (W-18). | Moderate | Flocculent culture, whitish sedimentation. | Nil | Nil | Nitrite reaction: negative. |
| Czapek broth with cellulose (Ref. O). | do | Greyish colonies on the surface | Greyish, developed on the colonies which are on the surface and on the paper sticking out of the broth. | Nil | Utilisation of the cellulose: positive. |
| Skimmed milk (Ref. P): | | | | | |
| a 25° C | Good | Well developed ring, light brownish. | Nil or very slight traces, whitish | | Total peptonisation without coagulation-pH changing from 6.3 to 7.0 in one month. |
| b 37° C | Poor | Badly developed ring, orange-brown. | Greyish white; traces | | Do. |
| Tresner and Danga agar for investigating the production of $H_2S$ (Ref. Q). | Moderate | Underside yellow | Whitish; traces | Nil | Production of $H_2S$: negative. |

Strains DS 21,647 corresponds to an original species which has been given the name *Streptomyces albocinerescens* DS 21,647 because of the appearance of its aerial mycelium which, whilst initially of a white colour, turns light grey in the sporulated zones when the sporulation appears; the sporulation is generally poor and weak and frequently only forms very slowly; on a certain number of media it even does not appear or only occurs very weakly, with the aerial mycelium then remaining whitish or turning to extremely light greyish.

*S. albocinerescens* DS 21,647 does not produce a melanine pigment on organic media. On all its culture media it forms a vegetative mycelium ranging from yellow to brown-yellow or yellow-brown and on the majority elaborates a soluble pigment in a shade ranging from yellow to yellow-brown.

*S. albocinerescens* DS 21,647 forms long straight or slightly flexuous sporophores which are generally unbranched or occasionally show one or two branches. Its spores are oval or cylindrical with rounded ends and measure 0.5 to 0.7 µ/l. to 1.2µ. Microscopic examinations have shown an identical organisation of the sporiferous structure on Pridham starch agar and on Hickey and Tresner agar.

Amongst the species which are described either in "Bergey's Manual of Determinative Bacteriology" (7th edition, The Williams and Wilkins Company, Baltimore, 1961) or in "The Actinomycetes" (II, S. A. Waksman, The Williams and Wilkins Company, Baltimore, 1961), the species which it resembles most is *S. aburaviensis* which, like it, does not produce melanine on organic media, has a white to light grey aerial mycelium, forms straight sporophores, and has a yellowish brown vegetative mycelium on "sucrose-nitrate-agar." However, it is not identical therewith because, if reference is made to the description of *S. aburaviensis* given in "The Actinomycetes" (page 166), it is seen that whilst these two strains are identical, a certain number of characteristics shown by these two strains are identical, *S. aburaviensis* gives a greyish-olive growth on glucose-asparagine agar and a pale olive growth on potatoes, whilst *S. albocinerescens* DS 21,647 gives a yellow growth on glucose-asparagine agar and a growth on potatoes which ranges in colour from weak brownish-yellow-grey to very light brownish. It should furthermore be noted that it has not been possible to observe any greenish or olive colouration of the vegetative mycelium of *S. albocinerescens* DS 21,647; the vegetative mycelium has always shown colours in shades ranging from light yellow or brown-yellow to yellow-brown. Furthermore, *S. aburaviensis* does not produce a soluble pigment on gelatin whilst *S. albocinerescens* DS 21, 647 produces a light yellow soluble pigment. Moreover, *S. aburaviensis* does not utilise lactose or sucrose and does utilise inulin whilst *S. albocinerescens* DS 21,647 utilises lactose and sucrose and does not utilise inulin.

Table V which follows indicates the cultural characteristics and biochemical properties of *S. albocinerescens* DS 21,647 observed under the same conditions as those of the strain *S. hygroscopicus* DS 9,751. The media used are the same and carry the same references.

TABLE V

| Culture medium | Degree of development | Vegetative mycelium or underside of the culture | Aerial structure (comprising the combination of the aerial mycelium and the sporulation) | Soluble pigment | Observations, and biochemical properties |
|---|---|---|---|---|---|
| Bennett agar (Ref. A) | Good | Thick and wrinkled, yellow | Whitish. Poorly developed | Very light yellow-brown | |
| Emerson agar (Ref. B) | do | Well developed. Yellow to light brown-yellow. | Whitish; traces | Light yellow-brown | |
| Hickey and Tresner agar (Ref. C) | do | Very well developed. Greyish yellow-brown. Underside yellow-brown. | Greyish-white. Very poorly developed | Yellow-brown | Long straight or slightly flexuous sporophores. |
| Pridham yeast extract agar (Ref. D) | do | Thick and wrinkled, yellow | Whitish. Very moderately developed | do | |
| Pridham oat and tomato agar (Ref. E) | do | Thick and wrinkled, yellow-brown. | Whitish; traces | do | |
| Carvajal oat agar (Ref. F) | do | Thick and wrinkled, yellow to yellow-brown. | Greyish-white. Poorly developed | do | |
| Glucose-peptone agar (W-7) | do | Thick and wrinkled, brown-yellow. | Whitish; traces | Brown-yellow | |
| Nutrient agar (W-5) | Moderate | Light yellowish | Nil | Nil | |
| Tyrosine agar (Ref. G) | Medium | Brownish yellow | Greyish-white. Very poorly developed | Yellow-brown | Partial solubilisation of the tyrosine. |
| Tyrosine-yeast extract agar (W-10) | do | Underside orange-brown | Light greyish. Poorly developed | Orange-brown; no blackening of the medium. | Formation of melanine: negative (readings taken in accordance with the recommendations of the author). |
| ["Melanine formation medium" of Waksman] (Ref. H) | | | | | |
| Krainsky calcium malate agar (Ref. I) | Moderate | Greyish yellow | Nil or whitish; traces | Weak greyish yellow | Good solubilisation of the malate. |
| Ovalbumin agar (W-12) | Very poor | Poorly developed. Weak yellowish grey. | Nil | Nil | |
| Glucose-asparagine agar (W-2) | Fairly good | Yellow | Whitish. Fairly well developed | Light greyish yellow | |
| Glycerine-asparagine agar (W-3) | Medium | do | Whitish; traces | Light yellow | |
| Starch-nitrate agar (W-10) | Moderate | Brown-yellow | Nil or greyish-white; traces. | Yellow-brown | |
| Pridham starch agar (Ref. J) | Good | Yellow to light brown-yellow. Underside yellow. | Very light greyish. Very moderately developed | Weak brownish yellow | |
| Czapek synthetic agar with sucrose (W-1) | do | Brown-yellow. Well developed; having a tendency to split. | Whitish. Very moderately developed | Yellow-brown | Hydrolysis of the starch: positive. |
| Czapek synthetic agar with glucose (Ref. K) | do | do | Greyish-white. Very poorly developed | do | Hydrolysis of the starch: positive. Sporophores long, straight or slightly flexuous. |
| Czapek synthetic agar with glycerine (Ref. L) | do | do | Nil or whitish; traces | do | |
| Culture on potato (W-27) | do | Very well developed, thick and wrinkled. Brown-yellow to yellow-brown. | Nil | Nil or very weak greyish brown. | |

TABLE V

| Culture medium | Degree of development | Vegetative mycelium or underside of the culture | Aerial structure (comprising the combination of the aerial mycelium and the sporulation) | Soluble pigment | Observations, and biochemical properties |
|---|---|---|---|---|---|
| 12% pure gelatine (Ref. M) | Moderate | Whitish flocculent culture penetrating into the gelatine. | Nil | Light yellow. Slowly produced. | Liquefaction of the gelatine; fairly rapid. |
| Dimmick glucose-nitrate broth (Ref. N). | do | Small greyish-white to light yellowish-grey colonies on the surface. | Nil | Nil | Nitrite reaction; positive. |
| Czapek broth with sucrose (W-18). | Medium | Yellowish velum | Nil | Pale yellow | Do. |
| Czapek broth with cellulose (Ref. O). | No development. | | | | Utilisation of the cellulose; negative. |
| Skimmed milk (Ref. P): (a) 25° C. | Good | Light greyish yellow ring | Nil | | Peptonisation without coagulation, starting after 2 weeks, complete in 1 month, pH changing from 6.3 to 7.0 in 1 month. |
| (b) 37° C. | Very moderate | Some light brown-yellow colonies on the surface. | Nil | | Coagulation followed by peptonisation. No appreciable change in pH in 1 month. |
| Tresner and Danga agar for investigating the production of H₂S (Ref. Q). | Good | Light yellow-brown | Nil | Weak brown-yellow | Production of H₂S; negative. |

The characteristics shown by the third microorganism producing the antibiotic 18631 RP connect it to the species *Streptomyces roseochromogenes* (Jensen) Waksman and Henrici, from which it only shows very slight differences, the main one being a retardation of the formation of the sporulation which only appears particularly slowly and sometimes does not even form on media where it is described for the type species. It is because of this property that this new strain has been named *Streptomyces roseochromogenes,* var. *oscitans.*

*S. roseochromogenes,* var. *oscitans,* strain DS 12976 forms oval spores measuring 0.3 to 0.4µ/0.6 to 0.8µ. Its sporiferous filaments are elongated and wind at their ends, forming 1 or 2 spirals, rarely more; they are generally separately inserted on the aerial mycelium filaments which carry them.

Generally, *S. roseochromogenes,* var. *oscitans,* strain DS 12976 develops a yellow vegetative mycelium on synthetic nutrient media and produces soluble pigments of a yellow to light yellowish colour. On organic nutrient media its vegetative mycelium is darker and assumes colours ranging from light yellow-brown to deep brown, even reaching blackish brown in certain cases; on the same media it produces more or less deep brown soluble pigments and produces a black melanine pigment on an appropriate medium containing tyrosine. The colour of its sporulated aerial mycelium is pink but, as has already been stated, the sporulation only forms extremely slowly, only starting after more than one month's culture; the media which have allowed the sporulation to be achieved under optimum conditions are media based on starch and on an ammonium salt such as Pridham starch agar or Grundy starch agar, and under the usual culture conditions it requires about two months' incubation at 26° C. to see the aerial mycelium assume a greyish pink shade on these media, indicating an appreciable degree of sporulation.

Table VI which follows indicates the cultural characteristics and biochemical properties of *S. roseochromogenes* var. *oscitans* DS 12976 observed under the same conditions as those of the strain *S. hygroscopicus* DS 9751; the media used are generally the same and carry the same references. The references or compositions of the other culture media are as follows:

Ref. R.—corresponds to Formula W-18 with 30 g. of sucrose replaced by 15 g. of glucose Ref. S.—"Manual of Methods for Pure Culture Study of Bacteria" of the Society of American Bacteriologists, Geneva, N.Y., II₅₀–18.

TABLE VI

| Culture medium | Degree of development | Vegetative mycelium or underside of culture | Aerial structure (comprising the combination of the aerial mycelium and the sporulation) | Soluble pigment | Observations, and biochemical properties |
|---|---|---|---|---|---|
| Hickey and Tresner agar (Ref. C). | Good | Underside deep chestnut to black-brown. | Whitish. Fairly well developed. Very slowly assumes a light greyish pink colouration when the sporulation forms. | Black-brown | Oval spores, measuring 0.3 to 0.4/0.6 to 0.8µ. Long sporiferous filaments, ending in 1 or 2 spirals. |
| Bennett agar (Ref. A) | do | Light yellow-brown | White. Moderately developed | Yellow-brown | |
| Pridham yeast extract agar (Ref. D). | Fairly good | Underside yellow-brown | Whitish to yellowish-white. Moderately developed | Deep orange-brown | |
| Pridham oat and tomato agar (Ref. E). | Good | Brownish yellow-grey. Thick and wrinkled, very well developed. | Whitish; traces | Weak yellow-brown | |
| Glucose-peptone agar (W-7) | do | Greenish yellow-brown to orange-brown. Very well developed. | Whitish; slight traces | Orange-brown to greenish brown. | |
| Nutrient agar (W-5) | Moderate | Greyish yellow-brown | Nil | Deep yellow-brown | |
| Tyrosine-yeast extract agar for the formation of melanine (Ref. H). | do | Brownish-black | Whitish. Very moderately developed | Greyish black. Produced from the second day of culture. | Formation of melanine: positive. |

| | | | |
|---|---|---|---|
| Krainsky calcium malate agar (Ref. F). | Almost nil | Colourless; traces | Nil | No solubilisation of the calcium malate. |
| Ovalbumin agar (W-12) | Very moderate | Vivid yellow | Pale yellow | |
| Glucose-asparagine agar (W-2) | Fairly good | Yellow | Yellow | |
| Glycerine-asparagine agar (W-3) | do | Orange-yellow to reddish orange. | Nil or whitish; slight traces | Light orange-yellow |
| Pridham starch-inorganic salts agar (Ref. J). | Moderate | Yellow to brownish yellow | Whitish. Moderately developed. Very slowly assumes a light greyish pink coloration when the sporulation forms. | Brownish, low intensity | Oval spores measuring 0.3 to 0.4/0.6 to 0.8μ. Long sporiferous filaments, ending in 1 or 2 spirals. Good hydrolysis of the starch. |
| Grundy starch agar (Ref. I) | do | Yellowish | White. Moderately developed. Very slowly assumes a light greyish pink coloration when the sporulation forms. | Nil | |
| Starch-nitrate agar (W-10) | do | Colourless to yellowish. Very moderately developed. | Nil | Nil or very weak yellowish | Hydrolysis of the starch slight and slow. |
| Czapek synthetic agar with sucrose (W-1). | Good | Light brownish yellow | Nil | Weak greyish yellow-brown | |
| Czapek synthetic agar with glucose (Ref. K). | do | Yellow | Nil | Weak-brown yellow | |
| Czapek synthetic agar with glycerine (Ref. L). | do | Light brownish grey | Nil | Greyish yellow-brown | |
| Starch-nitrate broth (W-19) | Moderate | Yellowish velum | Nil | Very pale yellow, fairly slow. | Reduction of nitrates to nitrites: positive. |
| Czapek broth with glucose (Ref. R). | do | Yellowish flocculent culture | Nil | Nil | Do. |
| Czapek broth with cellulose | No development | | | | Utilisation of the cellulose: negative. |
| Nutrient broth containing nitrates (Ref. S). | Moderate | Yellowish ring | | Brownish | Reduction of nitrates to nitrites: negative. |
| Culture on potato (W-27) | Good | Blackish brown. Thick and wrinkled, very well developed. | Whitish; traces | Brownish black. Abundant. | |
| 12% pure gelatine (Ref. M) | Medium | Brownish grey | Nil | Blackish brown. Abundant. | Liquefaction of the gelatine; positive but slow, only starting after 1 month's culture. |
| Tresner and Danga agar (Ref. Q) | Good | Black | Nil | Black. Abundant. Produced at the very start of the culture. | Production of H₂S: strongly positive. |
| Skimmed milk (Ref. P): | | | | | |
| (a) 25° C | do | Brownish ring | Nil | | Peptonisation without coagulation. pH changing from 6.2 to 7.0–7.2 in 1 month. |
| (b) 37° C | Moderate | Yellow-brown ring | Nil | | Peptonisation without coagulation. pH unchanged in 1 month. |

It emerges from examining the characteristics shown by the strain Streptomyces DS 12976 that it very closely approaches the species *S. roseochromogenes* (Jensen) Waksman and Henrici, the description of which is given in "The Actinomycetes," vol. 2, p. 268 (S. A. Waksman—The Williams and Wilkins Company, 1961). In comparison with all the species described in this work, it is this species with which it shows the greatest similarity and there is such a large measure of common points between these two strains and such slight differences that they cannot be considered as two different species.

Like *S. roseochromogenes* (Jensen) Waksman and Henrici, the strain of streptomyces DS 12976 belongs to the group of strains forming melanine pigments; its aerial mycelium takes a pink colouration when it reaches an appreciable degree of sporulation and its sporophores have spiral ends. Its vegetative mycelium shows colours ranging from pale yellow to deep brown according to the media in which it develops, and the soluble pigments it elaborates, which are light yellow or absent on synthetic media, become deep brown or even blackish brown on organic media. It forms a black soluble pigment on potato, a deep brown soluble pigment on gelatin which it liquefies slowly but indubitably, it peptonises milk without coagulating it, hydrolyses starch, produces H₂S and reduces nitrates, this last-mentioned characteristic however only being positive on synthetic media.

The differences detected between the two strains are slight. On the one hand, *S. reseochromogenes* (Jensen) Waksman and Henrici sometimes forms sporiferous filaments grouped in sets of three or five on one and the same base filament, thus producing the appearance of brooms or verticilla; the sporiferous filaments of the strain of Streptomyces DS 12,976 are usually inserted separately, though the combination of two sporiferous filaments on one and the same base filament is sometimes encountered. On the other hand, *S. roseochromogenes* (Jensen) Waksman and Henrici produces a colourless to pale yellow vegetative mycelium on Czapek synthetic sucrose agar, a greyish yellow vegetative mycelium on nutrient agar which thereafter becomes brownish red, and forms a pink aerial mycelium on Czapek synthetic sucrose agar, on glucose-asparagine agar and on nutrient agar; the strain of Streptomyces DS 12,976 produces a vegetative mycelium on Czapek synthetic sucrose agar which is more vigorously developed and rapidly shows a brownish yellow colouration; on nutrient agar its vegetative mycelium remains greyish yellow-brown without thereafter changing to brown-red and above all it does not form an aerial mycelium on synthetic Czapek sucrose agar, on asparagine agar or on nutrient agar. This latter fact is attributed to the particular slowness which it generally shows at the beginning in producing an aerial mycelium on all its culture media, and thereafter in developing its sporulation on the aerial mycelium once this has developed. This difference can however not be considered as a criterion for differentiating a species because, when the sporulated aerial mycelium is observed on media and under conditions where it can be obtained, it shows the pink shade of that of *S. roseochromogenes*. However, this is the most important feature by which the strain producing 18,631 RP is distinguished from *S. roseochromogenes* (Jensen) Waksman and Henrici and this is the reason why it must be considered as a special variety of this species and named "*Streptomyces roseochromogenes*," var. *oscitans*, strain DS 12,976.

The capacity of *Streptomyces hygroscopicus* DS 9,751, *Streptomyces albocinerescens* DS 21,647 and *Streptomyces roseochromogenes*, var. *oscitans* to utilise various sources of carbon and nitrogen to ensure their development was determined according to the principle of the method of Pridham and Gottlieb (J. of Bact. 56, 107–114, (1948)). The degree of development was observed after a suitable incubation time at 26° C. on the base medium indicated by the authors, replacing either the glucose by the various sources of carbon respectively tested, or replacing $$(NH_4)_2SO_4$$

by the various sources of nitrogen which were respectively tested. The results are respectively shown in Tables VII and VIII.

TABLE VII

| Sources of carbon tested | Utilisation by— | | |
|---|---|---|---|
| | S. hygroscopicus DS 9,751 | S. albocinerescens DS 21,647 | S. roseochromogenes var. oscitans |
| D-ribose | Positive | Negative | Positive but slow. |
| D-xylose | do | do | Positive. |
| L-arabinose | do | Positive | Do. |
| L-rhamnose | do | Negative | Negative. |
| D-glucose | do | Positive | Positive. |
| D-galactose | do | do | Do. |
| D-fructose | do | do | Do. |
| D-mannose | do | Negative | Do. |
| L-sorbose | do | do | Do. |
| Lactose | Negative | do | Negative. |
| Maltose | Positive | Positive | Positive. |
| Sucrose | do | do | Do. |
| Trehalose | do | do | Positive but slow. |
| Cellobiose | do | Negative | Positive. |
| Raffinose | do | Positive | Do. |
| Dextrin | do | Negative | Do. |
| Inulin | do | Positive | Do. |
| Starch | Negative | Negative | Do. |
| Glycogen | Positive | Positive | Do. |
| Glycerin | do | do | Do. |
| Erythritol | do | do | Do. |
| Adonitol | do | Negative | Negative. |
| Dulcitol | do | do | Do. |
| D-mannitol | Negative | do | Do. |
| D-sorbitol | Positive | do | Positive. |
| Inositol | Slight and slow | do | Negative. |
| | Positive | do | Positive. |

TABLE VIII

| Sources of nitrogen tested | Utilisation by | | |
|---|---|---|---|
| | S. hygroscopicus DS 9751 | S. albocinerescens DS 21,647 | S. roseochromogenes var. oscitans |
| NaNO₃ | Positive | Positive | Positive. |
| NaNO₂ | Negative | do | Do. |
| (NH₄)₂SO₄ | Positive | do | Do. |
| (NH₄)₂HPO₄ | do | do | Do. |
| Uracil | Negative | Negative | Negative. |
| Urea | Positive | Positive | Positive. |
| L-asparagine | do | do | Do. |
| Glycine | do | do | Do. |
| Sarcosine | do | Negative | Do. |
| DL-alanine | do | Positive | Do. |
| DL-valine | Positive but slow | do | Do. |
| DL-aspartic acid | Positive | do | Do. |
| L-glutamic acid | do | do | Do. |
| L-arginine | do | do | Do. |
| L-lysine | do | do | Do. |
| DL-serine | do | do | Do. |
| DL-threonine | do | do | Do. |
| DL-methionine | Negative | Negative | Negative. |
| Taurine | do | do | Do. |
| DL-phenylalanine | Positive | do | Positive. |
| L-tyrosine | do | Positive | Do. |
| DL-proline | do | do | Do. |
| L-hydroxyproline | do | do | Do. |
| Betaine | do | Negative | Negative. |
| Adenine | | | Positive. |
| Adenosine | | | Do. |
| Glucosamine | | | Do. |
| L-histidine | | | Do. |
| L-tryptophane | | | Do. |

According to a feature of the invention, the antibiotic 18,631 R.P. is produced by aerobically cultivating *Streptomyces hygroscopicus* DS 9,751 (NRRL 3418), *Streptomyces albocinerescens* DS 21,647 (NRRL 3419) or *Streptomyces roseochromogenes*, var. *oscitans* DS 12,976 (NRRL 3504), or a 18,631 R.P.-producing mutant thereof, using an aqueous nutrient medium containing assimilable sources of carbon, nitrogen and inorganic substances, and separating the antibiotic 18,631 R.P. formed during the culture.

The culture of one or other of these strains of streptomyces can be carried out by any of the known aerobic surface or submerged culture methods, the latter being preferred because they are more convenient. Conventional types of apparatus currently used in the fermentation industry may be employed. In particular, the following sequence of operations may be adopted:

The fermentation medium must contain an assimilable source of carbon and an assimilable source of nitrogen and inorganic substances (particularly chlorides) and optionally growth-promoting factors; all these ingredients may be supplied as well-defined products or complex mixtures such as those found in natural biological products of various origins.

As the source of assimilable carbon there may be used carbohydrates such as glucose, sucrose, lactose, dextrins, starch, molasses or other carbon-, hydrogen- and oxygen-containing substances such as certain sugar-alcohols, e.g. glycerin, or mannitol, or certain organic acids, e.g. lactic, citric or tartaric acid. Certain animal or vegetable oils such as lard oil, soya bean oil or cottonseed oil may be advantageously used instead of, or in admixture with, carbon-, hydrogen- and oxygen-containing substances.

The suitable sources of assimilable nitrogen are extremely varied. They may be very simple chemical compounds such as nitrates, inorganic and organic ammonium salts, urea or amino acids. They may also be complex substances containing principally nitrogen in protein form, e.g., casein, lactalbumin, gluten and their hydrolysates, soya bean meal, peanut meal, fish meal, meat extract, yeast extract, distillers' solubles or corn-steep liquor.

Amongst the inorganic substances added, some may have a buffering or neutralising effect, such as the alkali metal or alkaline earth metal phosphates, or the carbonates of calcium or magnesium. Others contribute to the ionic equilibrium needed for the development of the Streptomyces and for the production of the antibiotic; examples of these are the chlorides and sulphates of the alkali metals and alkaline earth metals. Finally, some of them act more especially as activators of the metabolism of the Streptomyces: to these belong the salts of zinc, cobalt, iron, copper and manganese.

The pH of the fermentation medium at the start of the culture should be between 6.0 and 7.8, and preferably between 6.5 and 7.5. The optimum fermentation temperature is 25–28° C., but satisfactory production is achieved at temperatures of from 23° to 35° C. The rate of aeration of the fermentation broth can vary within quite wide limits, but it has been found that an aeration rate of 0.3 to 2 litres of air per litre of broth per minute is particularly suitable. The maximum yield of antibiotic is obtained after 4 to 7 days culture, but this period depends predominantly on the medium used.

From the foregoing it will be realised that the general conditions for the culture of *S. hygroscopicus* DS 9,751, *S. albocinerescens* DS 21,647 and *S. roseochromogenes*, var. *oscitans* DS 12,976 for the production of the antibiotic 18,631 R.P. may be widely varied and adapted as appropriate to the circumstances.

18,631 R.P. can be isolated from the fermentation broths by various methods. The fermentation broth can be filtered at a pH greater than or equal to 7 but, under these conditions, a large part of the antibiotic remains in the filtration cake, which must also be treated in order to extract the active product. When the antibiotic is present in the filtrate of the culture broths, this solution is extracted with a water-immiscible solvent such as an aliphatic alcohol having 4 or 5 carbon atoms or a chlorinaed hydrocarbon, for example chloroform or methylene chloride, or an ester, in particular ethyl acetate.

However, it is preferable to extract the entire fermentation broth with one of these solvents. Under these conditions the extraction can be carried out at a pH of between 2 and 7. The crude antibiotic is obtained by concentration of the extract under reduced pressure and then precipitation with a poor solvent such as diethyl ether or hexane.

Another method for separating the antibiotic consists in carrying out the filtration of the fermentation broth at a pH below 6 and preferably about 5; under these conditions all the antibotic remains in the filtration cake from which it can be extracted with water containing a low molecular weight alcohol such as methanol, ethanol or propanol. The alcohol is thereafter removed by evaporation under reduced pressure and the antibiotic is extracted with a water-immiscible solvent, for example one of those mentioned above.

The antibiotic is generally present in solution in the final concentrate in the form of an acid. The precipitation of crude 18,631 R.P. is then improved by the addition of sodium methoxide to the concentrate.

Crude 18,631 R.P. in acid form or sodium salt can be purified in a first stage by fixing it on an ion exchange resin of strongly anionic character and high porosity, for example Dowex 1 X 2 resin in chloride form, from which it is eluted with an equeous alcoholic mixture containing an electrolyte, preferably a mixture of methanol and water (80–20 by volume) containing 30 g./l. of ammonium chloride. After removing the methanol under reduced pressure, the antibiotic is extracted from the eluates by means of a water-immiscible solvent, preferably chloroform or ethyl acetate. 18,631 R.P. is then obtained in a solid form by precipitation by means of a poor solvent, for example hexane or carbon tetrachloride, or by lyophilisation after transfer into t.-butanol.

The second purification stage can be carried out by chromatography on an alumina column, fixing the antibiotic from a solution in a solvent of low polarity, for example ethyl acetate, and then eluting it with a polar solvent in which it is more soluble, for example methanol.

The final purification can be carried out by various techniques such as counter-current distribution or crystallisation.

The counter-current distribution purification can be carried out, for example, with the system carbon tetrachloride-chloroform-methanol-water (10–3–10–2 by volume) (partition coefficient K=0.65).

Crystallisation can be carried out either by concentration of a solution of 18,631 R.P. in a solvent such as chloroform or ethyl acetate or by adding a poor solvent to a solution of 18,631 R.P.; the following pairs are given as illustrations: chloroform-carbon tetrachloride, acetone-water, acetone-acetonitrile, and dioxan-water.

The following examples illustrate the invention. In the following the activity is always determined by biological determination by the diffusion method, using *Micrococcus pyogenes albus* as the sensitive microorganism, and with reference to a sample of pure 18,631 R.P. taken as a standard at 1000 $\mu$g./mg. This activity is expressed in $\mu$g. per cc. for solutions and in $\mu$g. per mg. for solid products.

EXAMPLE 1

A 75-litre fermenter is charged with:

|  | G. |
|---|---|
| Corn-steep (50% solids content) | 800 |
| Sucrose | 1200 |
| Calcium carbonate | 300 |
| Ammonium sulphate | 80 |

Tap water, sufficient to make up to 35 litres.

The pH is then 6.10. The medium is sterilised by bubbling steam at 122° C. through it for 40 minutes. After cooling, its volume is 40 litres and its pH 7.10. The medium is then inoculated with a culture (200 cc.) of *Streptomyces hygroscopicus* DS 9,751 in a stirred Erlenmeyer flask. The culture is developed at 27° C. for 48 hours with agitation and aeration with sterile air; it is then suitable for inoculation of the production culture.

The production culture is carried out in a 30-litre fermenter charged with the following substances:

| Distillers' solubles | g | 750 |
|---|---|---|
| Cerelose | g | 150 |
| Soya bean oil | g | 225 |
| Cobalt chloride 6 H$_2$O | g | 0.02 |

Water, sufficient to make up to 15 litres.

After having adjusted the pH to 8.6 with 10 N sodium hydroxide solution (65 cc.), calcium carbonate (75 g.) is added, and the medium is then sterilised at 122° C. for 40 minutes. After cooling, its volume is 14 litres. The medium is made up to 15 litres by adding a sterile aqueous solution (1 litre) containing ammonium sulphate (30 g.). The resulting pH is 7.0.

Inoculation is then carried out with the inoculum culture (1 litre) in the 75-litre fermenter described above. The production culture is carried out at 27° C. for 161 hours with agitation, using a motor rotating at 240 r.p.m., and aeration with a volume of sterile air of 1 m.$^3$/hour. The pH of the broth is then 8.0 and its volume 10.5 litres. The amount of antibiotic present is 9 $\mu$g./cc.

EXAMPLE 2

A 170-litre fermenter is charged with:

|  | G. |
|---|---|
| Peptone (Cl$^-$=3.5%) | 1200 |
| Meat extract (Cl$^-$=1%) | 600 |
| Corn starch | 1200 |

Water, sufficient to make up to 110 litres.

The pH is adjusted to 7.0 with 10 N sodium hydroxide solution (95 cc.). The medium is sterilised by bubbling steam at 122° C., through it for 40 minutes. After cooling, its volume is 120 litres and its pH 7.0. The medium is then inoculated with a culture (200 cc.) of *Streptomyces albocinerescens* DS21,647 in a stirred Erlenmeyer flask. The culture is developed at 30° C. for 22 hours with agitation and aeration with sterile air; it is then suitable for inoculating the production culture.

The production culture is carried out in a 800-litre fermenter charged with the following substances:

| Distillers' solubles | kg | 16 |
|---|---|---|
| Partially hydrolysed starch | kg | 4 |
| Hydrated cobalt chloride (6H$_2$O) | g | 8 |

Water, sufficient to make up to 330 litres.

After having adjusted the pH to 7.80 with 10 N sodium hydroxide solution (1400 cc.), calcium carbonate (2 kg.) is added, and the medium is then sterilised at 122° C. for 40 minutes. After cooling, its volume, which is 355 litres, is made up to 400 litres by adding a sterile aqueous solution (40 litres) containing cerelose (10 kg.) and a sterile aqueous solution (5 litres) containing ammonium sulphate (800 g.). The resulting pH is 6.90.

The mixture is then inoculated with the inoculum culture (40 litres) in the 170-litre fermenter described above. The production culture is carried out at 30° C. for 71 hours with agitation, using a motor rotating at 260 r.p.m., and aeration with a volume of sterile air of 25 m.$^3$/hour. The pH of the broth is then 7.7 and its volume 410 litres. The amount of antibiotic present is 5 $\mu$g./cc.

EXAMPLE 3

The fermentation broth (930 litres), obtained under the conditions of Example 2 and of 5 $\mu$g./cc. strength, is introduced into a vat provided with a stirrer. The pH of the broth is adjusted to 5 by means of 5 N hydrochloric acid (12.6 litres). After half an hour's agitation, a filtration aid (50 kg.) is added and the suspension is filtered on a filter press. The filtration cake is washed with water (200 litres) and the filtrate (960 litres) is discarded. The filtration cake (196 kg.) is suspended, with agitation, in a water-methanol mixture (500 litres) containing 400 litres of methanol. The apparent pH of the mixture is then adjusted to 7 by adding 10 N sodium hydroxide solution. Stirring is continued for half an hour and the broth is then filtered on a filter press. The filtrate is collected and the cake is washed with a mixture (150 litres) of water and methanol containing 60% (by volume) of methanol. The combined filtrate and washings represent 675 litres of strength 5.7 $\mu$g./cc. The cake is discarded. The alcoholic filtrate is concentrated under reduced pressure (35 mm. Hg) at 35° C. to a volume of 80 litres. The concentrate is introduced into a vat provided with a stirrer. n-Butanol (40 litres) is added and the pH of the aqueous phase is adjusted to 3 by means of 5 N hydrochloric acid. Stirring is continued for 30 minutes and the upper phase, separated after decantation, is collected. Extraction with n-butanol (40 litres) is repeated. The spent mother liquors are discarded. The two extracts are combined (102 litres) and washed with water (10 litres). The wash liquid is discarded. The washed butanol extract is concentrated under reduced pressure (20 mm. Hg) and at 37° C. to a volume of 3 litres.

The concentrate is neutralised to pH 7 with a 25% (by volume) solution of sodium methoxide in n-butanol. The antibiotic in the neutralised concentrate is precipitated by means of hexane (30 litres). The antibiotic is isolated by filtration, washed with hexane and dried in a vacuum oven (5 mm. Hg, 40° C.). Crude 18,631 R.P. (379 g.) of 8.5 $\mu$g./mg. strength is thus obtained.

EXAMPLE 4

The broth (10.5 litres) from the fermentation described in Example 1 is introduced into a vat provided with a stirrer. n-Butanol (10.5 litres) and a filtration aid (500 g.) are added. The suspension is agitated for half an hour and filtered. The filtration cake is successively washed with n-butanol (1 litre) and water (1 litre). The filtrate is decanted. The lower aqueous phase is separated and discarded. The organic phase (11 litres) is collected and then concentrated under reduced pressure (40 mm. Hg) at 30° C. to a volume of 200 cc.

The antibiotic present in the concentrate is precipitated by means of hexane (2 litres). The antibiotic is isolated by filtration, washed with hexane and dried in a vacuum oven (40 mm. Hg, 35° C.). Crude antibiotic (14 g.) of 3 $\mu$g./mg. strength is thus obtained.

Chromatography of the crude product on Arches 302 paper impregnated with a phosphate M/3 buffer solution at pH 7, using chloroform as the development solvent, produces the same displacement as with the crude product isolated from cultures of *S. albocinerescens* DS21,647 in Example 3 (Rf=0.5).

On Arches 302 paper with a mixture of ethyl acetate cyclohexane (1—1) saturated with water as the mobile phase, the same displacement is observed as with the crude product isolated from cultures of *S. albocinerescens* DS21,647 in Example 3 (Rf=0.5).

On a thin layer of Kieselgel G, using a mixture of carbon tetrachloride-ethanol-acetic acid (90-6-6) as the development system, the same displacement is obtained as with the crude product isolated from cultures of *S. albocinerescens* DS21,647 in Example 3 (Rf=0.5).

EXAMPLE 5

The fermentation broth (480 litres), prepared as described in Example 2 but of 1 μg./cc. strength and at pH 7.1, is introduced into a vat provided with a stirrer. Ethyl acetate (400 litres) is added followed, after half an hour's agitation, by a filtration aid (45 kg.). The suspension is filtered on a filter press. The filtration cake is successively washed with ethyl acetate (80 litres) and with water (150 litres). The filtrate (1080 litres) is decanted. The lower aqueous phase is separated (660 litres) and discarded. The organic phase (420 litres) is washed with water (40 litres). The washed extract is concentrated under reduced pressure (60 mm. Hg) and at 22° C. to a volume of 3 litres.

The antibiotic in the concentrate is precipitated by means of hexane (30 litres). The antibiotic is isolated by filtration, washed with hexane and dried in a vacuum oven (5 mm. Hg, 40° C.). Crude 18,631 R.P. (37 g.) of strength 6 μg./mg. is thus obtained.

EXAMPLE 6

A crude product (1478 g.), prepared as indicated in Example 3 but of 5.8 μg./mg. strength, is dissolved in a methanol-water mixture (50—50 by volume; 12 litres). The resulting solution (having a pH of 7.0) is introduced into the upper part of a column (internal diameter 15 cm.) containing Dowex 1 X 2 resin (25 litres) in chloride form, the flow rate of the effluent being adjusted to 3 l./hour. When all the initial solution has passed through, the resin is successively washed, in a downwards direction, with the following mixtures, the flow rate being adjusted to 25 l./hour:

| | Litres |
|---|---|
| Methanol-water (50—50) (v./v.) | 60 |
| Methanol-water (60-40) (v./v.) containing 10 g./l. of $NH_4Cl$ | 80 |
| Methanol-water (60-40) (v./v.) containing 15 g./l. of $NH_4Cl$ | 80 |

18,631 R.P. is then eluted with a mixture of methanol-water (80-20 by volume) containing ammonium chloride (30 g./l.) (240 litres at a flow rate of 30 l./hour). The eluate is concentrated under reduced pressure at a temperature below 40° C. to 30 litres and the concentrate (pH 5.2) is extracted with chloroform (2 x 30 litres). The chloroform extract is concentrated under reduced pressure to a small volume and the antibiotic in the concentrate is transferred into t.-butanol (volume of the butanol solution, 1100 cc.). After removing an inactive insoluble material and lyophilisation, purified 18,631 R.P. (25 g.) of strength 320 μg./mg. is obtained.

EXAMPLE 7

18,631 R.P. (10 g.), prepared as described in Example 6, is dissolved in ethyl acetate (800 cc.). After clarification, the solution is passed through a column (internal diameter: 50 mm.) containing alumina (750 g.) which has beforehand been washed with dilute sulphuric acid. The column is thereafter washed with ethyl acetate (5 litres) and the antibiotic is eluted with 1 litre of methanol. The methanol solution is concentrated under reduced pressure to a small volume and the antibiotic in the concentrate is transferred into ethyl acetate, from which it crystallises; crystals (1.16 g.) of 945 μg./mg. strength are thus obtained.

EXAMPLE 8

The antibiotic (4.1 g.), prepared under the conditions described in Example 7, is dissolved in dioxan (450 cc.). After clarification of the solution, distilled water (450 cc.) is added very slowly with stirring; 18,631 R.P. crystallises out. After filtering, washing and drying, white crystals (3.6 g.) of strength 1000 μg./mg. are obtained. Melting point: 206° C.

$[\alpha]_D^{20} = -68° \pm 1.5°$ $[\alpha]_{436}^{20} = -199° \pm 2.5°$ (c.=1, ethanol)

*Elementary analysis.* — C=59.4%, H=5.45%, O=25.1%; N=4.0%, Cl=5.1%.

EXAMPLE 9

The antibiotic (0.5 g.), purified as described in Example 7, is dissolved in acetone (20 cc.) and recrystallised by slow addition of water (10 cc.). Fine white needles (0.445 g.) of 994 μg./mg. strength and having the physico-chemical characteristics of the product obtained in Example 8 are thus obtained.

EXAMPLE 10

A 170-litre fermenter is charged with:

| | G. |
|---|---|
| Peptone ($Cl^-=3.5\%$) | 1200 |
| Meat extract ($Cl^-=1\%$) | 600 |
| Corn starch | 1200 |
| Tap water, sufficient to make up to 110 litres. | |

The pH is adjusted to 7.10 with 10 N sodium hydroxide solution (120 cc.). The medium is sterilised by bubbling steam at 122° C. through it for 40 minutes. After cooling the volume of the broth is 120 litres and the pH is 7.10. The broth is inoculated with a culture (200 cc.) of *Streptomyces roseochromogenes* var. *oscitans* DS12,976 in a stirred Erlenmeyer flask. The culture is developed at 30° C. for 27 hours with agitation and aeration with sterile air; it is then suitable for inoculating the production culture.

The production culture is carried out in a 800-litre fermenter charged with the following substances.

| | Kg. |
|---|---|
| Distillers' solubles | 20 |
| Partially hydrolysed starch | 5 |
| Cobalt chloride 6 $H_2O$ | 10 |
| Tap water, sufficient to make up to 405 litres. | |

After having adjusted the pH to 7.50 with 10 N sodium hydroxide solution (1800 cc.), calcium carbonate (2.5 kg.) is added and the medium is then sterilised at 122° C. for 40 minutes. After cooling, the volume of the broth is 450 litres. It is made up to 500 litres by adding a sterile aqueous solution (50 litres) containing cerelose (12.5 kg.) and a sterile aqueous solution (5 litres) containing ammonium sulphate (1 kg.). The pH is 6.60.

The mixture is inoculated with the inoculum culture (50 litres) in the 170-litre fermenter described above. The production culture is carried out at 33° C. for 119 hours with agitation, using a motor rotating at 205 r.p.m., and aeration with a volume of sterile air of 25 m.³/hour. The pH of the medium is then 8.60 and the volume of the broth is 470 litres. The amount of antibiotic present is 288 μg./cc.

EXAMPLE 11

The fermetnation broth (990 litres), obtained under the conditions of Example 10 and of 288 μg./cc. strength, is introduced into a vat provided with a stirrer. The pH of the broth is adjusted to 5 by means of 5 N hydrochloric acid solution (10 litres). After half an hour's agitation, a filtration aid (50 kg.) is added and the suspension is filtered on a filter press. The filtration cake is washed with water (200 litres) and the filtrate (1025 litres) is discarded. The filtration cake (199 kg.) is suspended, with agitation, in a mixture (750 litres) of water and methanol containing 600 litres of methanol. The apparent pH of the mixture is then adjusted to 7 by adding 5 N sodium hydroxide solution (1 litre). The agitation is continued for 1 hours and the broth is then filtered on a filter press. The filtrate is collected and the cake is washed with a water-methanol mixture (100 litres) containing 60% (by volume) of methanol. The combined filtrate and washings represent 840 litres of 285 µg./cc. strength. The cake is discarded. The alcoholic filtrate is concentrated under reduced pressure (35 mm. Hg) at 35° C., to a volume of 100 litres. The concentrate is introduced into a vat provided with a stirrer. n-Butanol (50 litres) is added and the pH of the aqueous phase is adjusted to 3 by means of a 5 N hydrochloric acid solution. Stirring is continued for 30 minutes and the upper phase, separated after decantation, is collected. The extraction is repeated with n-butanol (30 litres). The spent mother liquors are discarded. The two extracts are combined (98 litres) and washed with water (10 litres). The wash liquid is discarded. The washed butanol extract is concentrated under reduced pressure (20 mm. Hg) and at 37° C. to a volume of 3 litres.

The concentrate is neutralised to pH 7 by adding a 25% (by volume) solution of sodium methoxide in n-butanol. The antibiotic in the neutralised concentrate is precipitated by means of hexane (30 litres). The crude antibiotic, in the form of its sodium salt, is isolated by filtration, washed with hexane and dried in an oven under reduced pressure (5 mm. Hg, at 40° C.). Crude 18,631 R.P. (477 g.) of 435 µg./mg. strength is thus obtained.

EXAMPLE 12

The crude product (1345 g.), prepared as described in Example 11 and of 332 µg./mg. strength, is dissolved in a mixture of methanol-water (50—50 by volume; 30 litres). The resulting solution is introduced into the upper part of a column (internal diameter 12 cm.) containing Dowex 1 X 2 resin (30 litres) in chloride form, the flow rate of the effluent being adjusted to 3 litres/hour. When all the initial solution has passed through, the resin is successively washed, in a downward direction, with the following mixtures, the flow rate being adjusted to 25 litres/hour:

| | Litres |
|---|---|
| Methanol-water (50—50 v./v.) | 20 |
| Methanol-water (60–40 v./v.) containing 15 g./l. of ammonium chloride | 120 |
| Methanol-water (70–30 v./v.) containing 15 g./l. of ammonium chloride | 60 |

The antibiotic is then eluted by means of a mixture of methanol-water (80–20 by volume) containing 30 g./l. of ammonium chloride (120 litres in 6 fractions of 20 litres).

Fractions 2, 3 and 4, containing the greater part of the activity, are recombined and concentrated to 30 litres under reduced pressure at a temperature below 40° C. The concentrate is extracted with ethyl acetate (once with 15 litres and twice with 7.5 litres) without modifying the pH. The extracts are combined, washed with water (5 litres), dried over sodium sulphate and concentrated to 10 litres under reduced pressure at a temperature below 40° C.

The solution thus obtained is percolated through a column (internal diameter 5 cm.) containing alumina (500 g.) which has before-hand been washed at pH 4. When the entire solution has passed through, development is carried out with ethyl acetate (2 litres). The effluents and the washings are combined and concentrated under reduced pressure to one-tenth of their volume, thereby causing crystallisation. After 2 hours' maturing in an ice bath, the crystals are filtered off, washed with cold ethyl acetate (200 cc.) and dried for 24 hours at 40° C. under a reduced pressure of less than 5 mm. Hg. Crystalline 18,631 R.P. (170 g.) is thus obtained in the form of the free acid of 855 µg./mg. strength.

Fractions 5 and 6 of the chromatography on Dowex 1 X 2 in the same manner yield a crystalline product (35 g.) in the form of the free acid of strength 702 µg./mg. (Furthermore, a product for recycling (124 g.) of 250 µg./mg. strength can be recovered by concentrating the crystallisation mother liquors and precipitation with hexane.)

EXAMPLE 13

The antibiotic (276 g.), prepared as described in Example 12, is dissolved at 30° C. in a mixture of acetone-dioxan (5–1 by volume; 2.4 litres). The solution is clarified and water (2.5 litres) is then added over the course of 3 hours at ambient temperature and with slow stirring. After standing overnight at ambient temperature, the crystals are filtered off, washed with water (1 litre) and dried for 48 hours at 60° C. under a pressure of 1 mm. Hg.

18,631 R.P. (231 g.) is thus obtained in the form of the free acid as white crystals of 990 µg./mg. strength, having the following physico-chemical properties:

*Elementary analysis.* (percent)—C, 60.0–60.3; H, 5.4–5.5; O, 24.9–25.0; N, 3.9–4.1; Cl, 4.75–4.95.

Calculated for $C_{35}H_{37}O_{11}N_2Cl$ (percent): C, 60.29; H, 5.35; O, 25.24; N, 4.02; Cl, 5.09.

Optical rotation:

$$[\alpha]_D^{20} = -67° \pm 1.5°, \quad [\alpha]_{436}^{20} = -196° \pm 2.5° \text{ (c.=1, ethanol)}$$

Ultra-violet spectrum (determined with a 10 mg./l. chloroform solution):

Absorption maximum at 275 nm.
Absorption minimum at 298 nm.
Shoulder at 307 nm.
Absorption maximum at 338 nm.

EXAMPLE 14

The crystalline antibotic (164 g.) in the form of the free acid, obtained in Example 12, is dissolved in acetone (500 cc.). The solution is clarified by filtering through a bed of Clarcel DIC, and a mixture of acetonitrile-water (50—50 by volume; 4.5 litres) is then added thereto over the course of 1 hour 30 minutes with slow stirring. After standing overnight at ambient temperature, the resulting crystals are filtered off, washed with the acetone-water mixture (50—50 by volume; 1 litre) and then with water (1 litre) and dried for 48 hours at 50° C. under less than 5 mm. Hg 18,631 R.P. (124 g.) is thus obtained in the form of the free acid as white crystals of 1000 µg./mg. strength, having the physico-chemical properties of the product obtained in Example 8.

The present invention also includes within its scope pharmaceutical compositions comprising 18,631 R.P., or a non-toxic salt thereof (preferably an alkali metal salt), in association with a pharmaceutically acceptable carrier and/or a compound which may itself be physiologically active, for example an antibiotic. Such compositions may be administered parenterally, rectally or preferably orally. In the last mentioned case 18,631 R.P. can be combined with a penicillin which is not destroyed by gastric acidity, such as penicillin V.

The proportion of active ingredient in these pharmaceutical compositions will vary according will vary according to the desired therapeutic effect and method of administration. For the treatment of infections by Gram-positive microorganisms in a human adult, the dose is generally between 1 and 3 g. per day administered orally or rectally and between 0.2 and 2 g. per day administered parenterally.

Solid compositions for oral administration include tablets, pills, powders and granules. In such solid compositions the active compound is mixed with at least one inert diluent such as sucrose, lactose or starch. The compositions may also contain, as is normal practice, additional substances other than inert diluents, e.g. a lubricant such as magnesium stearate. Liquid compositions for oral administration include pharmaceutically acceptable emulsions, solutions, suspensions, syrups and elixirs containing inert diluents commonly used in the art such as water and liquid paraffin. These liquid compositions may also comprise adjuvants, such as wetting and suspending agents, and sweetening and flavouring substances.

The compositions according to the invention for parenteral administration may be sterile aqueous or non-aqueous solutions, suspensions or emulsions. As the solvent or vehicle, propylene glycol, a polyethylene glycol, vegetable oils, in particular olive oil, and injectable organic esters, for example ethyl oleate, may be used. These compositions may also contain adjuvants, in particular wetting, emulsifying and dispersing agents. The compositions may be sterilised by, for example, filtration through a bacteria-retaining filter, by incorporation in the compositions of sterilisation agents, by irradiation or by heating. They may also be dissolved in sterile water or some other injectable sterile medium immediately before use.

Compositions for rectal administration are suppositories which contain, in addition to the active substance, excipients such as cacao butter or a suppository wax.

The following example illustrates pharmaceutical compositions according to the invention.

EXAMPLE 15

Tablets are prepared according to the usual technique having the following composition:

|  | G. |
|---|---|
| 18,631 R.P. | 0.250 |
| Starch | 0.150 |
| Colloidal silica | 0.070 |
| Magnesium stearate | 0.030 |

We claim:
1. The antibiotic herein designated 18,631 R.P., a white crystalline powder, acid in nature (neutralisation equivalent=695), melting at 206° C., easily soluble in dimethylsulphoxide, soluble in dilute strong bases, methanol, ethanol, acetone, dioxan, chloroform, dimethylformamide and ethyl acetate, sparingly soluble or insoluble in water, aqueous solutions of sodium bicarbonate, dilute strong acids, carbon tetrachloride, acetonitrile and hexane; structural formula and elementary analysis (calculated for $C_{35}H_{37}O_{11}N_2Cl$) (percent) C, 60.29; H, 5.35; O, 25.24; N, 4.02; Cl, 5.09; its optical rotations are $[\alpha]_D^{20} = -68° \pm 1.5°$ (c.=1,ethanol), $[\alpha]_{436}^{20} = -199° \pm 2.5°$ (c.=1, ethanol), $[\alpha]_D^{21} = -80° \pm 2°$ (c.=0.6, acetone) and $[\alpha]_{436}^{21} = -224° \pm 2.5°$ (c.=0.6, acetone)

its ultra-violet spectrum (determined on a chloroform solution containing 10 mg./l.) shows absorption maxima at 275 nm ($E_{1cm.}^{1\%}=444$) and 337 nm ($E_{1cm.}^{1\%}=434$) and a shoulder at 307 nm ($E_{1cm.}^{1\%}=201$)

and its infra-red spectrum (determined with tablets of a mixture with KBr) shows principal absorption bands as follows: 3440 shoulder, 3360 strong, 3300 shoulder, 3100 shoulder, 2970 medium, 2920 strong, 2840 medium, 2820 shoulder, 2720 weak, 2560 medium, 2100 medium, 1850 weak, 1685 very strong, 1625 strong, 1595 very strong, 1555 medium, 1540 shoulder, 1530 strong, 1500 shoulder, 1495 shoulder, 1485 very strong, 1460 medium, 1430 strong, 1360 strong, 1315 strong, 1280 medium, 1255 weak, 1215 very strong, 1190 medium, 1130 strong, 1110 medium, 1070 strong, 1030 strong, 990 strong, 980 weak, 950 strong, 935 medium, 855 medium, 810 strong, 780 strong, 750 strong, 735 medium, 720 weak, 695 weak, 660 shoulder, 645 shoulder, 625 strong, 605 shoulder, 565 weak, 555 medium, 530 medium and 500 medium, and nontoxic salts of the said antibiotic with bases.

2. Alkali metal salts of 18,631 R.P. as defined in claim 1.

3. The sodium salt of 18,631 R.P. as defined in claim 1.

References Cited

UNITED STATES PATENTS 3,494,914    2/1970    Keil et al. ___________ 260—210

OTHER REFERENCES

"Chem. Abst.", vol. 62, 1965, p. 9739.

LEWIS GOTTS, Primary Examiner

J. R. BROWN, Assistant Examiner

U.S. Cl. X.R.

195—80; 260—210 R; 424—180